United States Patent
Combs et al.

(10) Patent No.: US 9,811,338 B2
(45) Date of Patent: Nov. 7, 2017

(54) FLAG NON-MODIFICATION EXTENSION FOR ISA INSTRUCTIONS USING PREFIXES

(75) Inventors: Jonathan D. Combs, Austin, TX (US); Jason W. Brandt, Austin, TX (US); Robert Valentine, Kiryat Tivon (IL)

(73) Assignee: Intel Corporation, Santa Clara, CA (US)

( * ) Notice: Subject to any disclaimer, the term of this patent is extended or adjusted under 35 U.S.C. 154(b) by 757 days.

(21) Appl. No.: 13/976,261

(22) PCT Filed: Nov. 4, 2011

(86) PCT No.: PCT/US2011/060645
§ 371 (c)(1),
(2), (4) Date: Jun. 26, 2013

(87) PCT Pub. No.: WO2013/074074
PCT Pub. Date: May 23, 2013

(65) Prior Publication Data
US 2013/0297915 A1    Nov. 7, 2013

(51) Int. Cl.
*G06F 9/30* (2006.01)
(52) U.S. Cl.
CPC ...... *G06F 9/30145* (2013.01); *G06F 9/30094* (2013.01); *G06F 9/30185* (2013.01)
(58) Field of Classification Search
CPC ................. G06F 9/30145; G06F 9/30181
USPC ...................................................... 712/226
See application file for complete search history.

(56) References Cited

U.S. PATENT DOCUMENTS

| | | | | |
|---|---|---|---|---|
| 5,974,522 A * | 10/1999 | Torng | .................... | G06F 9/3836 710/267 |
| 6,173,394 B1 | 1/2001 | Guttag et al. | | |
| 6,904,515 B1 * | 6/2005 | Van Dyke | ........... | G06F 9/45537 703/26 |
| 2003/0188140 A1 * | 10/2003 | Henry | ................. | G06F 9/30174 712/226 |
| 2008/0177985 A1 | 7/2008 | Sandham et al. | | |
| 2009/0172356 A1 * | 7/2009 | Valentine | ............ | G06F 9/30149 712/208 |
| 2010/0268916 A1 | 10/2010 | Hu et al. | | |

FOREIGN PATENT DOCUMENTS

| | | |
|---|---|---|
| CN | 101196869 A | 6/2008 |
| TW | 200401187 A | 1/2004 |
| TW | I233545 B | 6/2005 |

OTHER PUBLICATIONS

Taiwan IPO Search Report, mailed Sep. 12, 2014, for Taiwan Patent Application No. 101141163, 2 pages.
PCT International Preliminary Report and Written Opinion for PCT/US11/60645, mailed May 20, 2014, 5 pages.
(Continued)

*Primary Examiner* — Andrew Caldwell
*Assistant Examiner* — Michael Metzger
(74) *Attorney, Agent, or Firm* — Nicholson De Vos Webster & Elliott LLP

(57) ABSTRACT

In one embodiment, a processor includes an instruction decoder to receive and decode an instruction having a prefix and an opcode, an execution unit to execute the instruction based on the opcode, and flag modification override logic to prevent the execution unit from modifying a flag register of the processor based on the prefix of the instruction.

18 Claims, 8 Drawing Sheets

(56) References Cited

OTHER PUBLICATIONS

Taiwan Application No. 101141163, Notice of Allowance, dated Mar. 17, 2015, 2 pages.
International Search Report mailed Jun. 28, 2012, for International Application No. PCT/US2011/060645, 9 pages.
First Office Action and Search report from foreign counterpart China Patent Application No. 201180074830.3, mailed Aug. 28, 2015, 14 pages.
Second Office Action from foreign counterpart China Patent Application No. 201180074830.3, mailed Jul. 13, 2016, 7 pages.

\* cited by examiner

FIG. 4

|  | Byte 0 | Byte 1 | Byte 2 |
|--|--|--|--|

(Bit Position) 7     0   7 6 5 4    0   7   6   3   2   1   0

3-byte VEX
510 : | 11000100 | R X B | m-mmmm | W | vvvv | L | pp |

7         0   7   6     3   2   1   0

2-byte VEX
520 : | 11000101 | R | vvvv | L | pp |

R: REX.R in 1's complement (inverted) form
    1: Same as REX.R=0 (must be 1 in 32-bit mode)
    0: Same as REX.R=1 (64-bit mode only)
X: REX.X in 1's complement (inverted) form
    1: Same as REX.X=0 (must be 1 in 32-bit mode)
    0: Same as REX.X=1 (64-bit mode only)
B: REX.B in 1's complement (inverted) form
    1: Same as REX.B=0 (Ignored in 32-bit mode).
    0: Same as REX.B=1 (64-bit mode only)
W: opcode specific (use like REX.W, or used for opcode
    extension, or ignored, depending on the opcode byte)

502 {
m-mmmm:
    00000: Reserved for future use (will #UD)
    00001: implied 0F leading opcode byte
    00010: implied 0F 38 leading opcode bytes
    00011: implied 0F 3A leading opcode bytes
    00100-11111: Reserved for future use (will #UD)

vvvv: a register specifier (in 1's complement form) or 1111 if unused.

501 {
L: Vector Length
    0: scalar or 128-bit vector
    1: 256-bit vector pp:   opcode extension providing equivalent functionality of a SIMD prefix
    00: None
    01: 66
    10: F3
    11: F2

FIG. 5

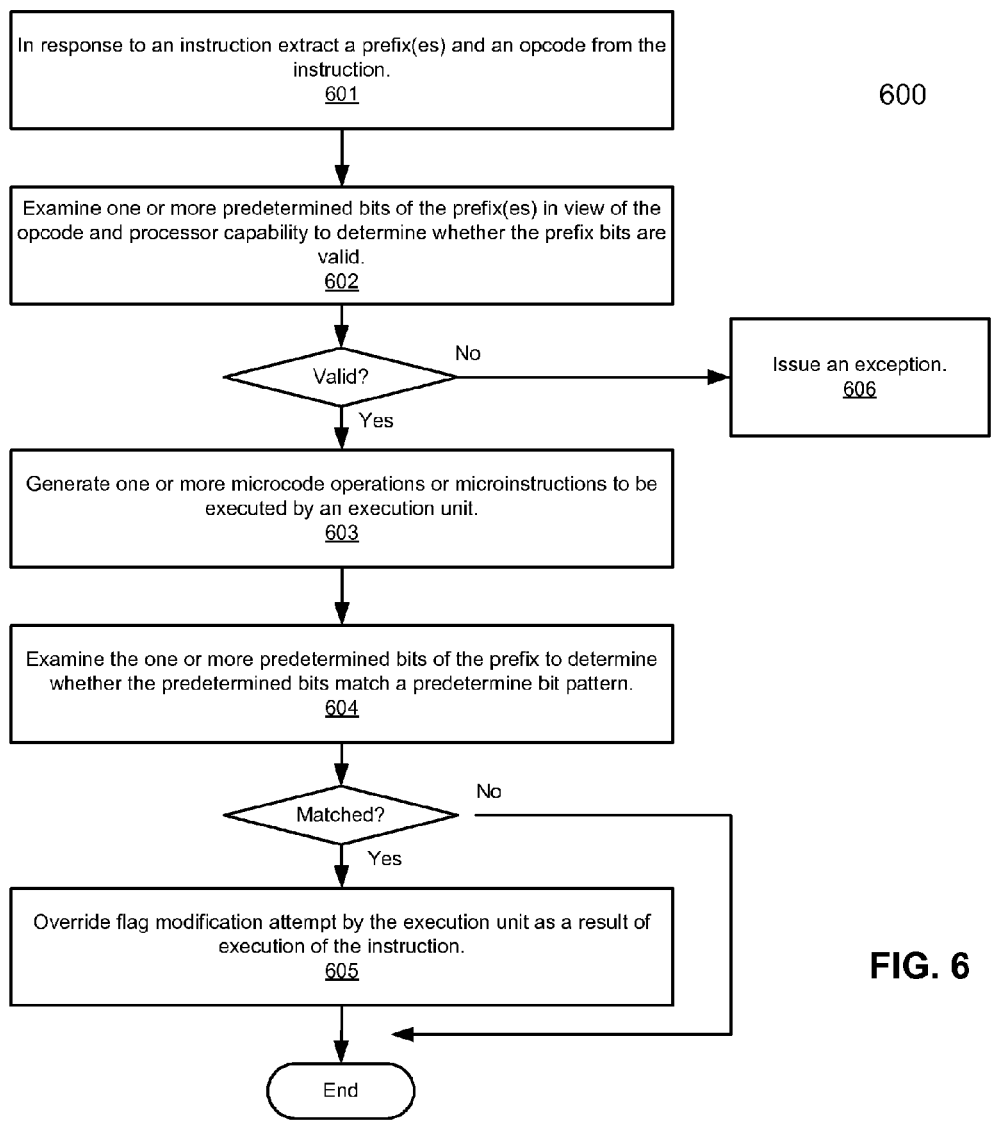

FLAG NON-MODIFICATION EXTENSION FOR ISA INSTRUCTIONS USING PREFIXES

CROSS-REFERENCE TO RELATED APPLICATION

This patent application is a U.S. National Phase Application under 35 U.S.C. §371 of International Application No. PCT/US2011/060645, filed Nov. 14, 2011, entitled FLAG NON-MODIFICATION EXTENSION FOR ISA INSTRUCTIONS USING PREFIXES.

FIELD OF THE INVENTION

Embodiments of the present invention relate generally to instruction processing apparatuses. More particularly, embodiments of the invention relate to an instruction processing apparatus with flag non-modification extension using prefixes.

BACKGROUND

Instructions involved in a general purpose register (GPR) such as integer registers are widely used in instruction set architectures (ISA) such as x86 architecture. Most x86 GPR (e.g., integer registers other than x87 or single instruction multiple data (SIMD)/advanced vector extension (AVX) registers) operations write to an integer register as well as manipulate an x86 arithmetic flag register. For example, an addition instruction such as ADD instruction modifies a flag (e.g., OF, SF, ZF, AF, CF, and PF flags) and updates a GPR destination. An increment instruction such as INC also modifies a flag (e.g., OF, SF, ZF, AF, and PF) and updates a GPR destination. Often, this is an unnecessary modification and yet adds complexity and potential performance implications due to unnecessary dependency chains.

BRIEF DESCRIPTION OF THE DRAWINGS

Embodiments of the invention are illustrated by way of example and not limitation in the figures of the accompanying drawings in which like references indicate similar elements.

FIG. 4 is a block diagram illustrating an example of a flag register.

FIG. 5 is a block diagram illustrating VEX prefix encoding utilized with AVX-based instructions according to one embodiment.

FIG. 6 is a flow diagram illustrating a method to process instructions according to one embodiment.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a prefix of an instruction is utilized to provide an indication whether a flag of a register should be modified when executing an opcode of the instruction by a processor. The opcode may be an x86 compatible opcode (e.g., x86 legacy opcodes). In one embodiment, when an instruction is received at a processor, processing logic such as an instruction decoder, is configured to examine a bit pattern of one or more bits of a prefix to determine whether an opcode of the instruction, when being executed, should be allowed to modify a flag of a register such as a flag register, a status register, and/or a condition code register, etc. If the bit pattern matches a predetermined pattern, an execution unit executing the opcode is prevented from modifying a flag that would normally be modified by the execution of the opcode.

Figure 1:
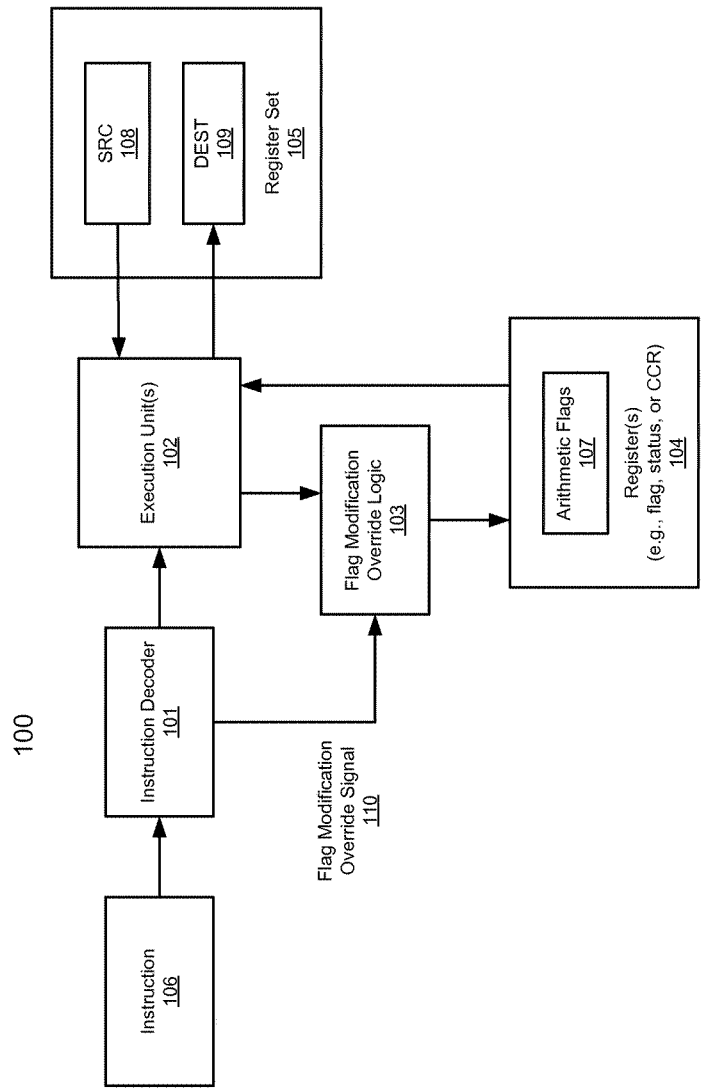
FIG. 1 is a block diagram illustrating an example of a processor according one embodiment.

FIG. 1 is a block diagram illustrating an example of a processor according one embodiment. Referring to FIG. 1, processor 100 may represent any kind of instruction processing apparatuses. For example, processor 101 may be a general-purpose processor. Processor 100 may be any of various complex instruction set computing (CISC) processors, various reduced instruction set computing (RISC) processors, various very long instruction word (VLIW) processors, various hybrids thereof, or other types of processors entirely. In one embodiment, processor 100 includes instruction decoder 101 to receive and decode instruction 106. Instruction decoder 101 may generate and output one or more micro-operations, micro-code, entry points, microinstructions, other instructions, or other control signals, which reflect, or are derived from, instruction 106. Instruction decoder 101 may be implemented using various different mechanisms. Examples of suitable mechanisms include, but are not limited to, microcode read only memories (ROMs), look-up tables, hardware implementations, programmable logic arrays (PLAs), and the like.

Processor 100 further includes one or more execution units 102, which may include an arithmetic logic unit, or another type of logic unit capable of performing operations based on instruction 106. As a result of instruction decoder 101 decoding instruction 106, execution unit 102 may receive one or more micro-operations, micro-code entry points, microinstructions, other instructions, or other control signals, which reflect, or are derived from, instruction 106. Execution unit 102 may be operable as a result of instruction 106 indicating source operand (SRC) 108 and to store a result in destination operand (DEST) 109 of register set 105. Execution unit 102 may include circuitry or other execution logic (e.g., software combined with hardware and/or firmware) operable to execute instructions or other control signals derived from instruction 106 and perform an operation accordingly. Execution unit 102 may represent any kinds of execution units such as logic units, arithmetic logic units (ALUs), arithmetic units, integer units, etc.

In one embodiment, instruction 106 may implicitly indicate and/or explicitly specify (e.g., through one or more dedicated fields or sets of bits) the source and destination operands. Examples of suitable sources of the operands include registers, memory, immediate of the instruction, and combinations thereof. In various embodiments, the source and destination operands may be 16-bit, 32-bit, or 64-bit operands, although this is not required.

In one embodiment, some or all of the source and destination operands may be stored in registers of a register set 105. The register set may be part of a register file, along with potentially other registers, such as status registers, flag registers, etc. A register may be a storage location or device that may be used to store data. The register set may often be physically located on die with the execution unit(s). The registers may be visible from the outside of the processor or from a programmer's perspective. For example, instructions may specify operands stored in the registers. Various different types of registers are suitable, as long as they are capable of storing and providing data as described herein. The registers may or may not be renamed. Examples of suitable registers include, but are not limited to, dedicated physical registers, dynamically allocated physical registers using register renaming, combinations of dedicated and dynamically allocated physical registers, etc. Alternatively, one or more of the source and destination operands may be stored in a storage location other than a register, such as, for example, a location in system memory.

Figure 2:
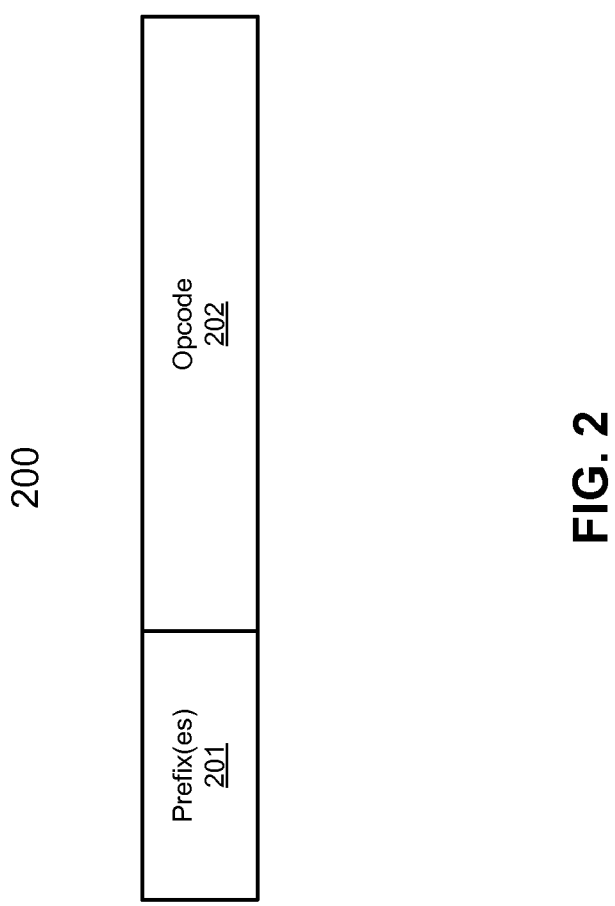
FIG. 2 is a block diagram illustrating an example of an instruction according to one embodiment.

Referring back to FIG. 1, in one embodiment, instruction 106 may include at least a prefix and an opcode as shown in FIG. 2. Referring to FIGS. 1 and 2, instruction 200 of FIG. 2 may represent instruction 106 of FIG. 1. In one embodiment, instruction 200 includes prefix 201 and opcode 202. When instruction 200 is received by instruction decoder 101, according to one embodiment, instruction decoder 101 is configured to generate one or more microcode operations or microinstructions based on opcode 202 to be executed by execution unit 102. In addition, instruction decoder 101 is configured to examine one or more bits of prefix 201 to determine whether execution unit 102 can modify at least one of flags 107 of register 104 as a result of execution of the microcode operations or microinstructions provided by instruction decoder 101.

In one embodiment, when a bit pattern of one or more bits of prefix 201 matches a predetermined pattern, instruction decoder 101 transmits flag modification override (FMO) signal 110 to FMO logic 103. FMO logic 103 is configured to intercept an attempt to modify any one of flags 107 from execution unit 102 and to prevent or override such an attempt. If the bit pattern of one or more bits of prefix 201 does not match the predetermined bit pattern, FMO logic 103 may allow execution unit 102 to modify flags 107. Information stored in prefix 201 and/or opcode 202 may be populated by a compiler and/or a programmer. FMO logic 103 may be implemented in hardware, firmware, software, or a combination thereof. Note that a particular bit pattern of prefix 201 may indicate that a particular flag can be modified while other flags may not be modifiable. Thus, the bit pattern of prefix 201 dictates which of the flags 107 can or cannot be modified by execution unit 102. Also note that the format of instruction 200 of FIG. 2 has been shown and described for the purpose of illustration only; other formats may also be applied.

Figure 3:
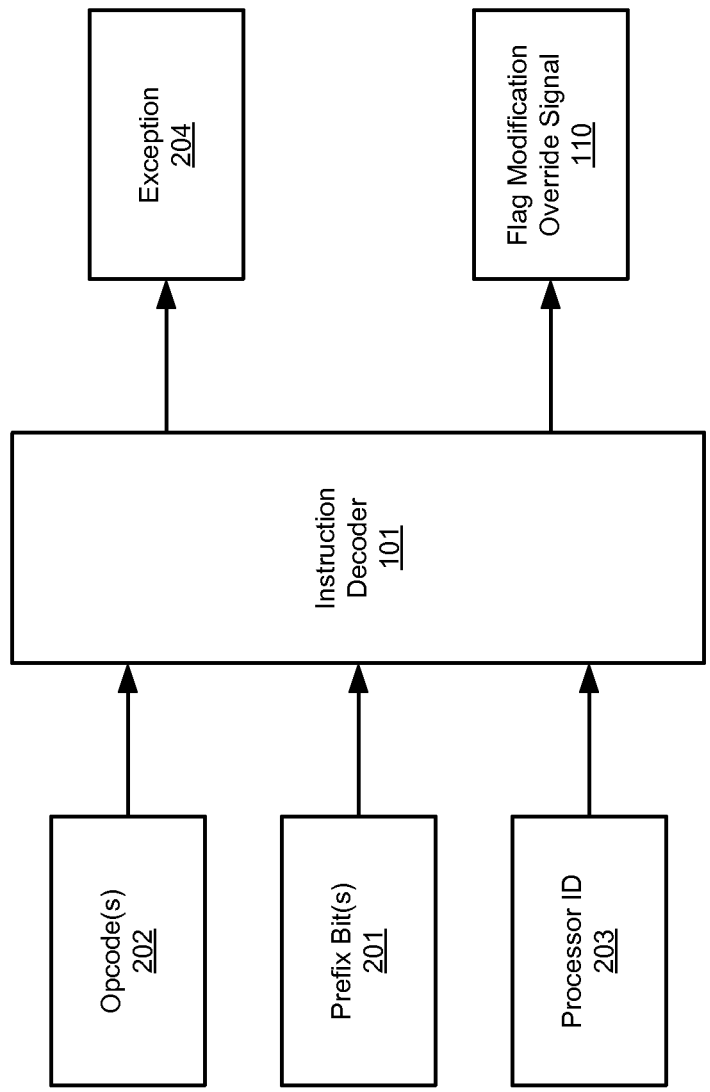
FIG. 3 is a block diagram illustrating an example of a processor according one embodiment.

In one embodiment, prior to generating microcode operations or microinstructions from the opcode, instruction decoder 101 is configured to examine, given an opcode provided in opcode 202, whether prefix 201 having a particular bit pattern is valid. If it is determined that the prefix 201 is invalid based on opcode 202, an exception (e.g., #UD) is generated and the opcode may not be executed. Furthermore, instruction decoder 101 may also examine whether instruction 200 is valid given a capability of processor 100, which may be determined based on a processor identifier such as a CPUID as shown in FIG. 3. Referring to FIG. 3, based on information such as prefix 201, opcode 202, and/or processor ID 203, instruction decoder 101 is configured to generate exception 204 (e.g., undefined or UD operation) if the instruction is determined to be invalid. Otherwise, instruction decoder 101 is configured to generate FMO signal 110 based on prefix 201 and/or opcode 202, as well as one or more microcode operations or microinstructions to be executed by execution unit 102. Referring back to FIG. 1, based on FMO signal 110, FMO logic 103 is configured to intercept a modification attempt from execution unit 102 to modify flags 107 of register 104, where FMO logic 103 may or may not allow such a modification dependent upon the specific prefix of instruction 106.

Figure 4:
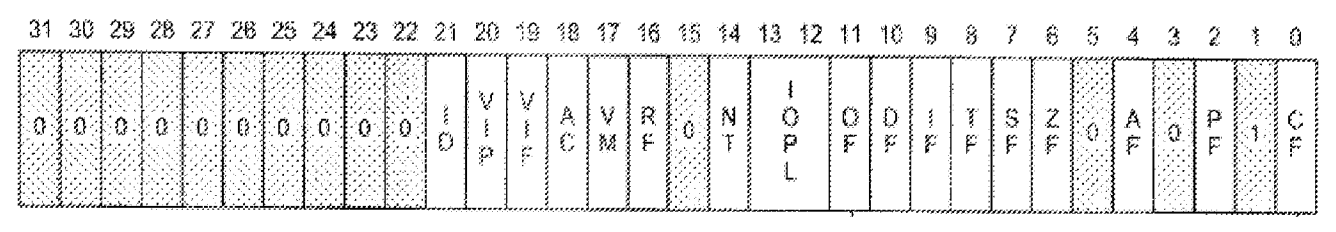

In one embodiment, flags 107 may represent one or more of arithmetic flags. Register 104 may be a status register, a flags register (e.g., EFLAGS), a condition code register (CCR), or a combination thereof. An example of register 104 is shown in FIG. 4, which represents an example of the EFLAGS register. Flags 107 may include one or more bits, often in a register such as register 104. Flags 107 do not have to be bits in a register. A flag may include a flip-flop circuit. A bit flag may store a binary value, such as a binary one or a binary zero. The bits may store a sequence of binary values or a code. Such binary values, or sequences of binary values, may represent different values of a flag. These different values of the flag may have an assigned or understood meaning to processor 100 or other logic device. Flags 107 may be used for various different purposes. In some cases, flags 107 may be used to record a status, state, condition, or outcome of operations within processor 100 or other logic device. Flags 107 may include a carry flag (CF), an overflow flag (OF), a sign flag (SF), a zero flag (ZF), an auxiliary carry flag (AF), or a parity flag (PF), or a combination thereof, as shown in FIG. 4. Note that not all of such flags may be included in all processors or other logic devices. Additionally, different names are sometimes used for these different flags.

According to one embodiment, at least one prefix of instruction 106 is compatible with the advanced vector extension (AVX)-based ISA of Intel Corporation of Santa Clara, Calif. An embodiment utilizes an AVX prefix of an AVX-based instruction to encode a "flag non-modifying" indication to the ISA. Being done via a prefix allows this extension to be applied broadly to the existing legacy set of x86 GPR instruction opcodes. This can be applied to a variety of modes such as 16-bit, 32-bit, or 64-bit mode. By adding the flag non-modifying indication in the prefix space, embodiments allow a rich set of flag non-modifying instructions to be generated while utilizing mostly pre-existing legacy hardware with only slight modifications.

In one embodiment, one or more AVX prefix bits are utilized to denote flag non-modification to any or all legacy integer instruction opcodes that write both an integer GPR destination and update one or more arithmetic flag bits. Such a prefix avoids new opcodes and corresponding decoder hardware from needing to be defined whenever flag non-modification for an existing legacy instruction is desired.

FIG. 5 is a block diagram illustrating VEX prefix encoding utilized with AVX-based instructions according to one embodiment. Referring to FIG. 5, AVX-based prefixes include a 3-byte C4 VEX encoding 510 or a 2-byte C5 VEX encoding 520. Any of prefixes 510 and 520 may be implemented as part of prefix 201 of FIG. 2. In one embodiment, L bit 501 is utilized to indicate whether an execution unit should be allowed to modify a flag of a register such as register 104 of FIG. 1. Typically, L bit 501 is only valid when the opcode of the instruction is a vector-based instruction, where L bit represents a vector length as shown in FIG. 5. Otherwise, a fault (#UD) may be generated indicating that the instruction is invalid.

In one embodiment, an "L" bit of VEX prefix encodings of AVX-based instructions is utilized to indicate whether a flag should be allowed to modify by an opcode associated with an x86 instruction such as an integer GPR instruction. Conventionally, if the L bit is set to a non-zero logical value while the opcode is an integer GPR instruction, an exception or fault will be generated. In this embodiment, the L bit is utilized to denote the flag non-modification indication for an integer GPR instruction. Thus, instead of issuing an exception, an instruction decoder may interpret the L bit as a flag non-modification indication as long as the flag non-modification extension is enabled, which may be determined based on the type of a processor that processes the instruction such as CPUID. For example, with the CPUID flag set to a predetermined value, if the instruction decoder detects the non-zero L bit in an AVX-based instruction, the instruction decoder will no longer trigger an exception or fault; rather, the instruction decoder denotes it as a flag non-modification extension.

According to another embodiment, a combination of multiple bits in the VEX prefix encoding may be utilized for flag non-modification extension. Referring back to FIG. 5, certain bits that are not utilized in typical vector instructions such as "mmmmm" bits 502 may be utilized to indicate whether a flag should be modified by an execution unit. In this embodiment, upper three bits 503 of bits 502 are not utilized in regular vector-based instructions. As a result, certain bit patterns of a combination of bits 503 can be utilized to indicate whether a flag should be modified. Note that some of bits 502 in combination of L bit 501 may also be utilized for the same purpose.

FIG. 6 is a flow diagram illustrating a method to process instructions according to one embodiment. For example, method 600 may be performed by instruction decoder 101 of FIG. 1. Referring to FIG. 6, at block 601, in response to an instruction received at a processor, prefix and opcode are extracted from the instructions. At block 602, processing logic is to examine one or more bits of the prefix in view of the opcode and capability of the processor (e.g., CPUID) to determine whether the prefix bits are valid. If not, at block 606, an exception is generated. If the prefix or the instruction is valid, at block 603, processing logic generates one or more microcode operations or microinstructions to be executed by an execution unit. At block 604, processing logic examines one or more bits of the prefix to determine whether the bits match a predetermined bit pattern. If so, at block 605, processing logic overrides an attempt by an execution unit to modify a flag as a result of execution of the microcode operations or microinstructions.

Figure 7:
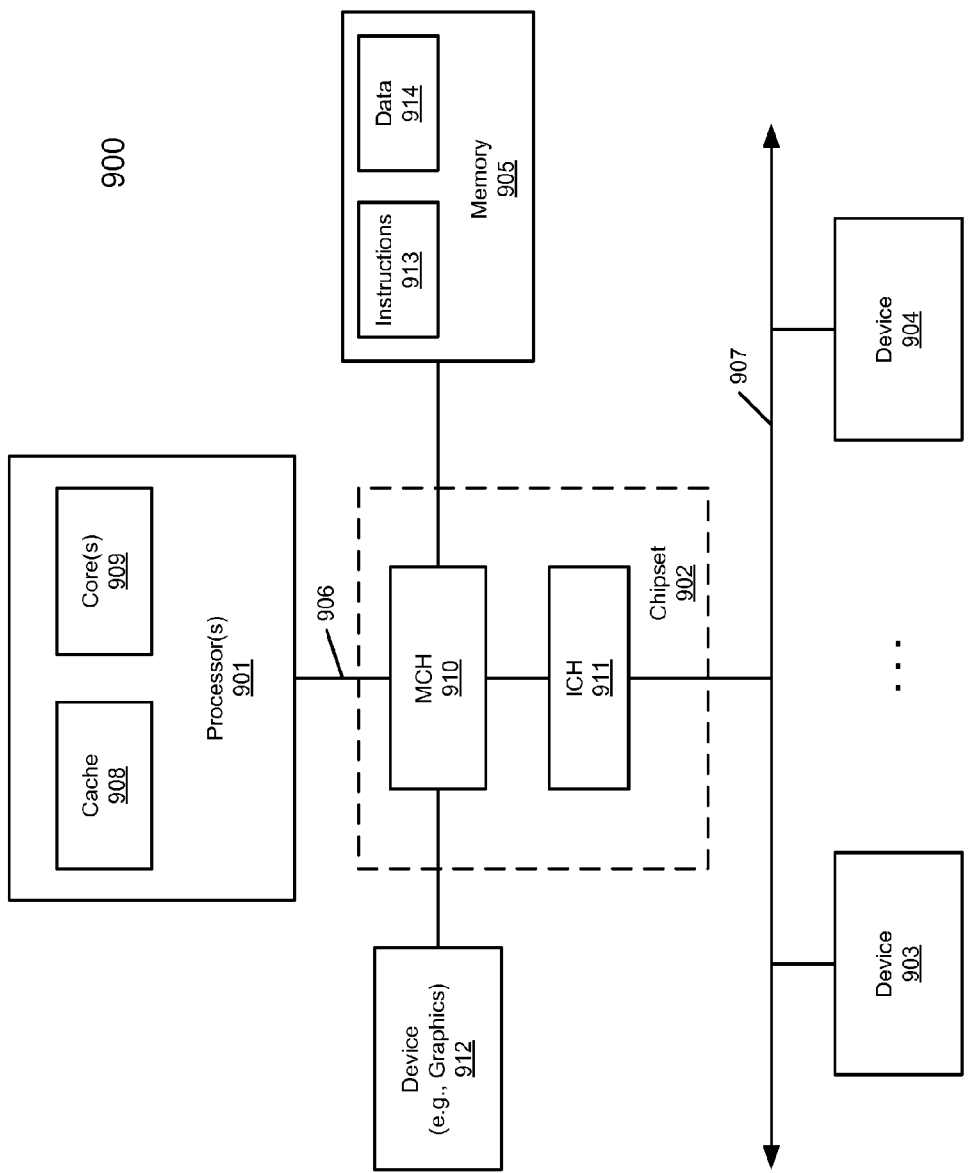
FIG. 7 is a block diagram illustrating an example of a data processing system according to one embodiment.

FIG. 7 is a block diagram illustrating an example of a data processing system according to one embodiment of the invention. Processor 901 of system 900 may represent processor 100 of FIG. 1 as described above. System 900 may represent a desktop, a laptop, a tablet, a server, a mobile phone (e.g., Smartphone), a media player, a personal digital assistant (PDA), a personal communicator, a gaming device, a network router or hub, a wireless access point or repeater, a set-top box, or a combination thereof. Note that while FIG. 7 illustrates various components of a data processing system, it is not intended to represent any particular architecture or manner of interconnecting the components; as such details are not germane to embodiments of the present invention. It will also be appreciated that network computers, handheld computers, mobile phones, and other data processing systems which have fewer components or perhaps more components may also be used with embodiments of the present invention.

Referring to FIG. 7, in one embodiment, system 900 includes processor 901 and chipset 902 to couple various components to processor 901 including memory 905 and devices 903-904 via a bus or an interconnect. Processor 901 may represent a single processor or multiple processors with a single processor core or multiple processor cores 909 included therein. Processor 901 may represent one or more general-purpose processors such as a microprocessor, a central processing unit (CPU), or the like. More particularly, processor 901 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 901 may also be one or more special-purpose processors such as an application specific integrated circuit (ASIC), a field programmable gate array (FPGA), a digital signal processor (DSP), a network processor, a graphics processor, a network processor, a communications processor, a cryptographic processor, a co-processor, an embedded processor, or any other type of logic capable of processing instructions. For example, processor 901 may be a Pentium® 4, Pentium® Dual-Core, Core™ 2 Duo and Quad, Xeon™, Itanium™, XScale™ Core™ i7, Core™ i5, Celeron®, or StrongARM™ microprocessor available from Intel Corporation of Santa Clara, Calif. Processor 901 is configured to execute instructions for performing the operations and steps discussed herein.

Processor 901 may include an instruction decoder, which may receive and decode a variety of instructions. The decoder may generate and output one or more micro-operations, micro-code entry points, microinstructions, other instructions, or other control signals, which reflect, or are derived from, an original input instruction. The decoder may be implemented using various different mechanisms. Examples of suitable mechanisms include, but are not limited to, microcode read only memories (ROMs), look-up tables, hardware implementations, programmable logic arrays (PLAs), and the like.

The decoder may not be a required component of processor 901. In one or more other embodiments, processor 901 may instead have an instruction emulator, an instruction translator, an instruction morpher, an instruction interpreter, or other instruction conversion logic. Various different types of instruction emulators, instruction morphers, instruction translators, and the like, are known in the arts. The instruction conversion logic may receive the bit range isolation instruction, emulate, translate, morph, interpret, or otherwise convert the bit range isolation instruction, and output one or more instructions or control signals corresponding to the original bit range isolation instruction. The instruction conversion logic may be implemented in software, hardware, firmware, or a combination thereof. In some cases, some or all of the instruction conversion logic may be located off-die with the rest of the instruction processing apparatus, such as a separate die or in a system memory. In some cases, the instruction processing apparatus may have both the decoder and the instruction conversion logic.

Processor 901 and/or cores 909 may further include one or more execution units coupled with, or otherwise in communication with, an output of the decoder. The term "coupled" may mean that two or more elements are in direct electrical contact or connection. However, "coupled" may also mean that two or more elements are not in direct connection with each other, but yet still co-operate or interact or communicate with each other (e.g., through an intervening component). As one example, the decoder and the execution unit may be coupled with one another through an intervening optional buffer or other component(s) known in the arts to possibly be coupled between a decoder and an execution unit. Processor 901 and/or cores 909 may further include multiple different types of execution units, such as, for example, arithmetic units, arithmetic logic units (ALUs), integer units, etc.

Processor 901 may further include one or more register files including, but are not limited to, integer registers, floating point registers, vector or extended registers, status registers, and an instruction pointer register, etc. The term "registers" is used herein to refer to the on-board processor storage locations that are used as part of macro-instructions to identify operands. In other words, the registers referred to herein are those that are visible from the outside of the processor (from a programmer's perspective). However, the registers should not be limited in meaning to a particular type of circuit. Rather, a register need only be capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store 32-bit or 64-bit integer data. A register file may contain extended multimedia SIMD registers (e.g., XMM) for packed data. Such registers may include 128 bits wide XMM registers and 256 bits wide registers (which may incorporate the XMM registers in their low order bits) relating to SSE2, SSE3, SSE4, GSSE, and beyond (referred to generically as "SSEx") technology to hold such packed data operands.

Processor 901 and/or cores 909 may also optionally include one or more other well-known components. For example, processor 901 may optionally include instruction fetch logic, pre-decode logic, scheduling logic, re-order buffers, branch prediction logic, retirement logic, register renaming logic, and the like, or some combination thereof. These components may be implemented conventionally, or with minor adaptations that would be apparent to those skilled in the art based on the present disclosure. Further description of these components is not needed in order to understand the embodiments herein, although further description is readily available, if desired, in the public literature. There are literally numerous different combinations and configurations of such components known in the arts. The scope is not limited to any known such combination or configuration. Embodiments may be implemented either with or without such additional components.

Chipset 902 may include memory control hub (MCH) 910 and input output control hub (ICH) 911. MCH 910 may include a memory controller (not shown) that communicates with a memory 905. MCH 910 may also include a graphics interface that communicates with graphics device 912. In one embodiment of the invention, the graphics interface may communicate with graphics device 912 via an accelerated graphics port (AGP), a peripheral component interconnect (PCI) express bus, or other types of interconnects. ICH 911 may provide an interface to I/O devices such as devices 903-904. Any of devices 903-904 may be a storage device (e.g., a hard drive, flash memory device), universal serial bus (USB) port(s), a keyboard, a mouse, parallel port(s), serial port(s), a printer, a network interface (wired or wireless), a wireless transceiver (e.g., WiFi, Bluetooth, or cellular transceiver), a media device (e.g., audio/video codec or controller), a bus bridge (e.g., a PCI-PCI bridge), or a combination thereof.

Figure 8:
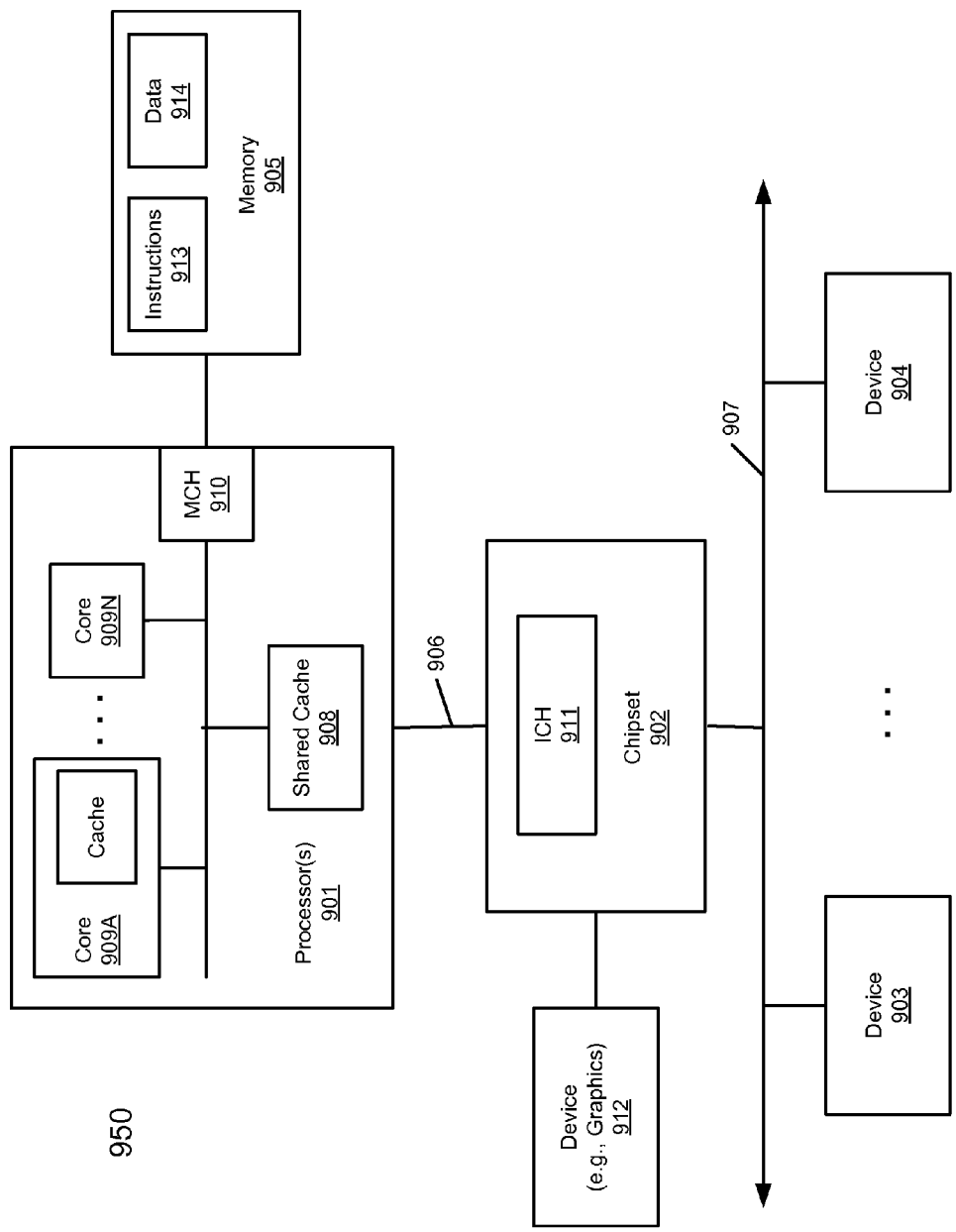
FIG. 8 is a block diagram illustrating an example of a data processing system according to another embodiment.

MCH 910 is sometimes referred to as a Northbridge and ICH 911 is sometimes referred to as a Southbridge, although some people make a technical distinction between them. As used herein, the terms MCH, ICH, Northbridge and Southbridge are intended to be interpreted broadly to cover various chips who functions include passing interrupt signals toward a processor. In some embodiments, MCH 910 may be integrated with processor 901. In such a configuration, chipset 902 operates as an interface chip performing some functions of MCH 910 and ICH 911, as shown as system 950 in FIG. 8. Furthermore, graphics accelerator 912 may be integrated within MCH 910 or processor 901.

Memory 905 may store data including sequences of instructions that are executed by processor 901, or any other device. For example, executable code 913 and/or data 914 of a variety of operating systems, device drivers, firmware (e.g., input output basic system or BIOS), and/or applications can be loaded in memory 905 and executed by processor 901. An operating system can be any kind of operating systems, such as, for example, Windows® operating system from Microsoft®, Mac OS®/iOS® from Apple, Android® from Google®, Linux®, Unix®, or other real-time operating systems. In one embodiment, memory 905 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk or a flash storage device. Front side bus (FSB) 906 may be a multi-drop or point-to-point interconnect. The term FSB is intended to cover various types of interconnects to processor 901. Chipset 902 may communicate with other devices such as devices 903-904 via point-to-point interfaces.

Cache 908 may be any kind of processor cache, such as level-1 (L1) cache, L2 cache, L3 cache, L4 cache, last-level cache (LLC), or a combination thereof. Cache 908 may be shared with processor cores 909 of processor 901. Cache 908 may be embedded within processor 901 and/or external to processor 901. Cache 908 may be shared amongst cores 909. Alternatively, at least one of cores 909 further includes its own local cache (e.g., caches 908A-908N) embedded therein. At least one of cores 909 may utilize both the local cache and the cache shared with another one of cores 909. Processor 901 may further include a direct cache access (DCA) logic to enable other devices such as devices 903-904 to directly access cache 908. Processor 901 and/or chipset 902 may further include an interrupt controller, such as an advanced programmable interrupt controller (APIC), to handle interrupts such as message signaled interrupts.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method, comprising:
in response to decoding an instruction having a prefix and an opcode received at a processor, wherein the prefix includes a vector length bit when the opcode includes a vector instruction that is supported by the processor,
executing, by an execution unit of the processor, the instruction based on the opcode; and
preventing the execution unit from modifying a flag register of the processor based on the vector length bit of the prefix of the instruction.

2. The method of claim 1, further comprising:
extracting the prefix from the instruction; and
determining whether the instruction is valid based on the prefix in view of a capability of the processor, wherein the execution unit is to execute the instruction only if the instruction is valid.

3. The method of claim 2, wherein determining whether the instruction is valid comprises examining a value of one or more bits of the prefix in view of a processor identifier that identifies a type of the processor.

4. The method of claim 2, further comprising generating an exception indicating that the instruction is invalid, if one or more bits of the prefix matches a predetermined bit pattern based on the capability of the processor.

5. The method of claim 1, further comprising:
preventing the execution unit from modifying the flag register if one or more bits of the prefix match a first predetermined bit pattern; and
allowing the execution unit to modify the flag register if one or more bits of the prefix match a second predetermined bit pattern.

6. The method of claim 1, wherein the opcode of the instruction represents an integer operation that when executed would normally modify the flag register.

7. A processor, comprising:
an instruction decoder to receive and decode an instruction having a prefix and an opcode, wherein the prefix includes a vector length bit when the opcode includes a vector instruction that is supported by the processor;
an execution unit to execute the decoded instruction based on the opcode; and
flag modification override logic to prevent the execution unit from modifying a flag register of the processor based on the vector length bit of the prefix of the instruction.

8. The processor of claim 7, wherein the instruction decoder is to extract the prefix from the instruction and to determine whether the instruction is valid based on the prefix in view of a capability of the processor, wherein the execution unit is to execute the instruction only if the instruction is valid.

9. The processor of claim 8, wherein the instruction decoder is to examine a value of one or more bits of the prefix in view of a processor identifier that identifies a type of the processor.

10. The processor of claim 8, wherein the instruction decoder is to generate an exception indicating that the instruction is invalid, if one or more bits of the prefix matches a predetermined bit pattern based on the capability of the processor.

11. The processor of claim 7, wherein the flag modification override logic is to
prevent the execution unit from modifying the flag register if one or more bits of the prefix match a first predetermined bit pattern, and
allow the execution unit to modify the flag register if one or more bits of the prefix match a second predetermined bit pattern.

12. The processor of claim 7, wherein the opcode of the instruction represents an integer operation that when executed would normally modify the flag register.

13. A system, comprising:
an interconnect;
a processor coupled to the interconnect to:
receive and decode, by an instruction decoder of the processor, an instruction having a prefix and an opcode, wherein the prefix includes a vector length bit when the opcode includes a vector instruction that is supported by the processor,
execute the decoded instruction based on the opcode, and
prevent modification of a flag register of the processor based on the vector length bit of the prefix of the instruction; and a dynamic random access memory (DRAM) coupled to the interconnect.

14. The system of claim 13, wherein the processor is to extract the prefix from the instruction and to determine whether the instruction is valid based on the prefix in view of a capability of the processor, wherein the processor is to execute the instruction only if the instruction is valid.

15. The system of claim 14, wherein the processor is to examine a value of one or more bits of the prefix in view of a processor identifier that identifies a type of the processor.

16. The system of claim 14, wherein the processor is to generate an exception indicating that the instruction is invalid, if one or more bits of the prefix matches a predetermined bit pattern based on the capability of the processor.

17. The system of claim 13, wherein the processor is to
prevent the execution unit from modifying the flag register if one or more bits of the prefix match a first predetermined bit pattern, and
allow the execution unit to modify the flag register if one or more bits of the prefix match a second predetermined bit pattern.

18. The system of claim 13, wherein the opcode of the instruction represents an integer operation that when executed would normally modify the flag register.

* * * * *